Dec. 23, 1941.                E. M. CLAYTOR                 2,267,603
                           OVERDRIVE CONTROL SYSTEM
                            Filed March 27, 1940

INVENTOR
Edward M. Claytor
BY
Spencer Hardman & Fehr
his ATTORNEYS

Patented Dec. 23, 1941

2,267,603

UNITED STATES PATENT OFFICE 2,267,603

OVERDRIVE CONTROL SYSTEM

Edward M. Claytor, Anderson, Ind., assignor to General Motors Corporation, Detroit, Mich., a corporation of Delaware Application March 27, 1940, Serial No. 326,231

7 Claims. (Cl. 74—472)

This invention relates to overdrives for automobiles, and particularly to the type of overdrive which comprises concentric sun and ring gears and intermediate planet gears. The planet gears are rotated orbitally by an engine driven shaft and the ring gear is connected with the propeller shaft or other shaft connected with the vehicle transition wheels. When this mechanism is not functioning, the gears referred to rotate as a unit. When the overdrive is operating, the sun gear is retained in a stationary position by a latch or pawl received by notches in a plate connected with the sun gear. In order to go from overdrive to normal drive, it is necessary to retract the pawl. To facilitate retraction of the pawl from the sun gear locking ring the engine is momentarily rendered inoperative to apply torque through the overdrive by momentarily rendering the ignition non-operative. In my co-pending application, Serial No. 290,356, filed August 16, 1939, I disclose the combination of a control relay and a time lag or measured time relay which are so coordinated that, when the control relay opens for the purpose of permitting the retraction of the sun gear locking pawl, the engine ignition is automatically rendered inoperative. A predetermined time interval after the opening of the control relay, the measured time relay operates to restore the ignition. As pointed out in my application referred to and as will be explained in detail hereafter, when the control relay operates to render the ignition non-operative, a condition is brought about which facilitates retraction of the sun gear locking pawl by a restoring means such as a spring. Likewise when the engine is restored to operative condition by the measured time relay, a similar condition is brought about conducive to a retraction of the sun gear locking pawl. Therefore the system disclosed in my copending application provides two instances where conditions prevail which are conducive to the retraction of the sun gear locking pawl, namely, (1) when the control relay opens to render the ignition operative and (2) when the measured time relay operates to restore the ignition. If the pawl is not retracted in the first instance, another opportunity is presented for its retraction.

The object of the present invention is to increase the number of instances, between the time when the main control relay opens to render the ignition inoperative and the time when the measured time relay operates to restore ignition, all of which instances are instances during which conditions exist which are conducive to retraction of the sun gear locking pawl.

In order to accomplish this and other objects, I provide a vibratory interrupter which comes into operation at the time the circuit of the magnet coil of the control relay is broken. Therefore during the time between the opening of the control relay and the final restoration of the ignition by the measured time relay the vibratory interrupter operates intermittently to maintain the ignition operative and non-operative. The periodicity of the vibratory interrupter would be different from the periodicity of the ignition timer over range of engine speeds within which it is intended that the transition from overdrive to normal drive is to occur. Therefore, during the interval between the opening of the control relay and the final restoration of ignition by the measured time relay, there will be several instances where the ignition circuit will be opened when the breaker points of the ignition timer begin to separate. In this way I provide several other instances of interruption and restoration of engine torque which are also conducive to retraction of the sun gear locking pawl.

A further object of this invention is to provide for the prevention of the transition from overdrive to normal drive when the vehicle speed is above a certain value.

Further objects and advantages of the present invention will be apparent from the following description, reference being had to the accompanying drawing wherein a preferred embodiment of the invention is clearly shown.

Figures 1, 2:
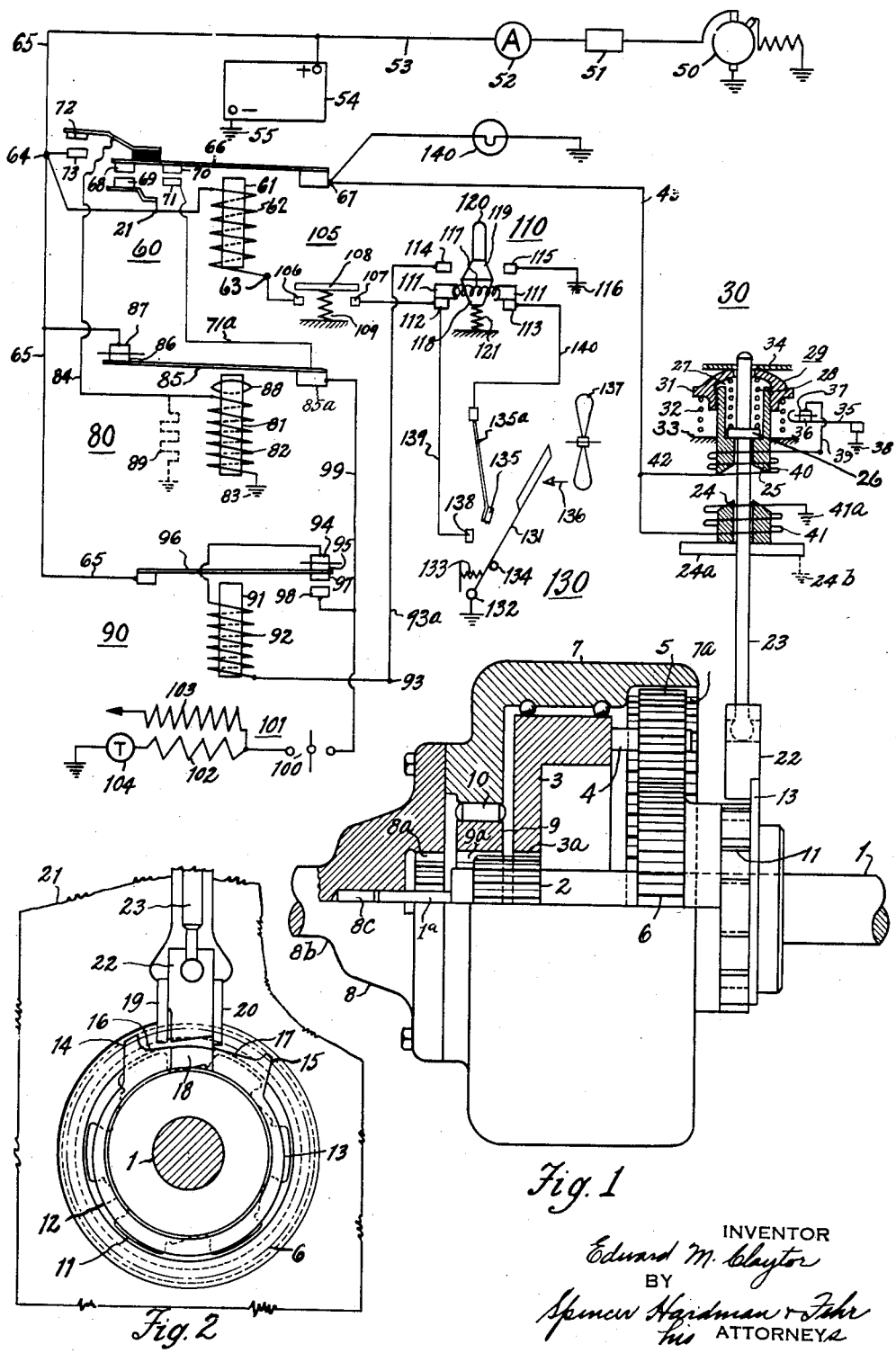
Fig. 1 shows a diagram of an overdrive to which the control of my present invention is applied, said control being illustrated by a wiring diagram forming a part of Fig. 1.
Fig. 2 is a diagram showing the sun gear locking pawl and pawl blocking member which has been moved to position to permit movement of the pawl into engagement with the sun gear locking ring.

Referring to Fig. 1, numeral 1 indicates the driving shaft of the overdrive mechanism. The shaft 1 receives its power from the change speed gear mechanism housed in a box which would be located between the overdrive mechanism and the engine clutch. The shaft 1 is provided with external splines 2 which mesh with the internal splines 3a of the ring 3 and with internal splines 9a of the driving member of an overrunning clutch 9. The external splines 2 mesh also with internal splines 8a of a coupling member 8 to which the propeller shaft 8b may be attached. The splines 2 connect together the members 3 and 9 as shown in Fig. 1, when it is desired to use the overdrive mechanism. When it is not intended that the overdrive mechanism shall be used for any considerable period of time, the overdrive may be entirely disconnected by moving the shaft 1 endwise toward the left so that its external splines 2 will engage the internal splines 8a of the member 8, thus connecting together the members 8 and 9 and leaving the member 3 free. The shaft 1 is supported for axial movement at both ends. The support for the right hand end of the shaft 1 is not shown. At the left end of the shaft 1 it is provided with a reduced portion 1a having a sliding fit within an axially aligned recess 8c provided in the member 8.

The ring 3 carries a plurality of rods 4 each rotatively supporting a planet gear 5 which meshes with a sun gear 6 and with an internal ring gear 7a integral with ring 7, which cooperates with the clutch rollers 10, which in turn cooperate with a driving clutch cam 9 to receive transmission of torque from the driving member 1 at such time as the driving member 9 tends to rotate ahead of the member 7. However, when a ring 11 attached to the sun gear 6 is engaged by a sun gear locking pawl 22 which is received by one of a series of notches 12 in ring 11, the internal ring gear 7a and its ring 7 are driven at a speed exceeding the speed of the clutch driving member 9. Under these conditions the ring 7 will overrun the clutch driving member 9. The pawl 22 is normally maintained out of engagement with the ring 11 by a pawl rod 23 which is controlled in a manner to be described. Movement of the pawl 22 into engagement with the ring 11 is obstructed, except under certain conditions, by a blocker plate 13 which is frictionally dragged by ring 11. The blocker plate 13 is provided with stop lugs 14 and 15 which project beyond stop surfaces 16 and 17 which may be engaged under certain conditions by the pawl 22. The surfaces 16 and 17 are interrupted by a notch 18 of sufficient width to permit movement of the pawl 22 between the surfaces 16 and 17 when the notch 18 is brought into alignment with the pawl 22, as shown in Fig. 2. The pawl 22 is guided between bosses 19 and 20 of the frame 21 of the overdrive mechanism. Bosses 19 and 20 project into the plane of the blocker plate 13 so as to be engaged by lugs 14 and 15, respectively. When the ring 11 rotates clockwise, the blocker plate 13 will be frictionally dragged clockwise until its lug 14 strikes the boss 19, and further movement of the blocker plate 13 in the clockwise direction will cease. When the ring 11 rotates counterclockwise, the blocker plate 13 will be frictionally dragged counterclockwise until its lug 15 engages the boss 20 whereupon counterclockwise movement of the plate 13 will cease. An explanation of the clockwise and counterclockwise movements of the ring 11 will be given in connection with the mode of operation of the control device which controls the overdrive gearing.

The sun gear locking pawl 22 is attached to a pawl rod 23 forming a part of a solenoid unit 30. Rod 23 extends through stationary core 24 and through a solenoid armature 25. Rod 23 has a shoulder portion 26 located within a recess 27 provided by the armature 25. Recess 27 houses a coil spring 28 located in a state of compression between the shoulder 26 and a nut 29 threadedly attached to the armature 25. Nut 29 has a flange 31 engaged by coil spring 32 located in a state of compression between flange 31 and a stationary member 33. Spring 32 normally urges the nut 29 against a stationary plate 34. Flange 31 is engageable with a resilient contact arm 35 carrying a contact 36 normally engaged with a contact 37. Arm 35 is grounded at 38. Contact 37 is connected by a wire 39 with the main attracting coil 40 of the solenoid connected with a terminal 42. Coil 40 is a series coil comprising a relatively small number of turns of relatively coarse wire. Terminal 42 is connected with solenoid holding coil 41 which comprises a relatively large number of turns of fine wire. Holding coil 41 is grounded at 41a.

A generator 50 is connected through a reverse current relay 51, an ammeter 52 and a wire 53 with a storage battery 54 grounded at 55.

The main control relay is designated in its entirety by the numeral 60. It comprises a core 61 surrounded by magnet coil 62 connected between terminals 63 and 64 which is connected by wire 65 with battery 54. Core 61 cooperates with an armature 66 connected with terminal 67 and carrying contacts 68 and 70 which are normally separated respectively from contacts 69 and 71. Contact 69 is connected with terminal 64. Contact 71 is connected by wire 71a with terminal 85a of relay 80. Armature 66 insulatingly supports a contact 72 normally separated from a contact 73 connected with terminal 64. Contacts 68 and 69 close ahead of contacts 72 and 73 and open after contacts 72 and 73 have opened. In order that the various pairs of contacts controlled by the armature 66 may open and close in the proper order, at least one contact of each pair should be resiliently mounted, for example, contacts 69, 71 and 72.

The measured time relay is designated in its entirety by the numeral 80. It comprises a core 81 surrounded by a magnet coil 82 grounded at 83 and connected by wire 84 with contact 72 of relay 60. Core 81 cooperates with an armature 85 carrying a contact 86 normally engaging a contact 87 connected with wire 65. When the relay 80 is energized, the armature 85 is attracted toward the core 81 and seals thereon. When the circuit of the coil 82 is interrupted, the armature 85 does not instantaneously return to circuit closing position, but this action is delayed due to the fact that the armature seals against the core and due to the fact that the decay of flux in the relay is retarded by elements such as a short circuit coil 88 surrounding the core or a non-induction resistance 89 paralleling the magnet coil 82. Either or both of these elements may be used to obtain the desired results. To secure uniformity of time-delay action of relay 80, either its core 81 or its armature 85 should be chromium-plated to avoid direct iron-to-iron contact when the armature seals against the core.

The vibratory interrupter is designated in its entirety by the numeral 90. It includes a core 91 surrounded by coil 92 connected with a terminal 93 and with a contact 94 normally engaged by contact 95 on an armature 96 which is connected with wire 65. Armature 96 carries also a contact 97 normally separated from contact 98 connected with a wire 99 leading from terminal 85a of relay 80 to an ignition switch 100 connected with an ignition coil 101 having a primary winding 102 and a secondary winding 103. Primary winding 102 is connected with an engine-operated ignition timer 104 which is grounded. Winding 103 leads to the usual ignition distributor.

The circuit of the winding 62 of control relay 60 is controlled by a series of three switches 105, 110 and 130.

Switch 105 comprises stationary contacts 106 and 107 normally out of engagement with a bridging contact 108 retained by spring 129. Contact 108 is moved into engagement with contacts 106 and 107 in response to a movement of the transmission gear shift lever to intermediate or high position. Switch 110 is foot-operated and comprises a movable contact 111 for bridging stationary contacts 112 and 113. Contact 112 is connected with contact 107 of switch 105. The switch 110 is used also to control the circuit of coil 92 of vibratory relay 90. For this purpose the bridging contact 111 is caused to engage the stationary contacts 114 and 115 connected respectively with terminal 93 of relay 90 and with ground 116. The switch 110 is of a type in which the movable contact 111 must bridge either the pair of contacts 112—113 or 114—115. For convenience in illustrating such a switch in a wiring diagram, I have shown this switch as a garter band switch in which an annulus of helically coiled wire forming a resilient garter band 117 is engageable with either of two conical surfaces 118 and 119 of a plunger 120. The plunger 120 is held in the upper position by spring 121. When in this position, the band 117 must engage the surface 118. Since the band 117 tends to contract, it would ride down the surface 118 thereby moving the bridging conductor 111 with which it is associated into engagement with the contacts 112 and 113. However, when the plunger 120 is pushed down to move its surface 118 down past the band 117 and to bring its surface 119 into engagement with the band 117, then the contact 111 will move upwardly into engagement with the contacts 114 and 115. The normal position of the switch 110 is as shown with contact 111 engaging contacts 112 and 113. The switch plunger 120 may be pushed downwardly to cause the connection between contacts 112 and 113 to be broken and the connection between contacts 114 and 115 to be made in response to a downward movement of the automobile accelerator pedal to the full extent of its travel.

Switch 130 is responsive to vehicle speed and may be a centrifugal switch or may be, as shown, an air switch. As an air switch, it comprises an air vane contact 131 which swings on a grounded pivot 132 and is urged normally by spring 133 against a stop 134 and out of engagement with contacts 135 and 138. Contact 135 is resiliently mounted on a blade 135a connected by wire 140 with contact 113 of switch 110. Contact 139 is connected by wire 139 with contact 112 of switch 110. When vehicle speed attains a certain value, such as 25 M. P. H. for example, the vane 131 engages contact 135 due to a current of air impinging upon it in the direction of arrow 136, this air current being produced by the engine cooling fan 137. When the vehicle speed attains a certain high value such as 50 to 60 M. P. H., for example, vane 131 will also engage contact 138.

The operation of the system is as follows:

While the engine is running, the ignition switch 100 will be closed. When the vehicle transmission is set for driving through certain gear trains, the switch 105 will be closed. As stated before, contacts 112 and 113 of switch 110 are normally bridged by contact 111. All three switches 105, 110 and 130 being closed when the vehicle is operating at a certain speed or higher, the winding 62 of relay 60 will receive current from the battery 54, thereby causing armature 66 to be attracted and to engage the pairs of contacts 68—69, 70—71, 72—73. The magnet coils 40 and 41 of the solenoid unit 30 are connected with the battery through contacts 68 and 69 and armature 66, terminal 67 and wire 43. The solenoid armature 25 moves toward the core 24 carrying with it the nut 29 which urges the upper end of spring 28 downwardly, thereby tending to move the rod 23 downwardly.

When the solenoid is not excited, the spring 32, acting through the pawl rod 23, keeps pawl 22 out of engagement with the blocker plate 13. When the engine drives the transmission, the ring 11 moves counterclockwise as viewed in Fig. 2 and the plate 13 is frictionally dragged counterclockwise so that its lug 15 engages boss 20 thereby causing surface 17 to be in the path of movement of the pawl 22. When the engine speed is increased to the speed where the switch 130 closes, the hand controlled change speed gearing being in intermediate or high gear, the solenoid will be energized in the manner described. The pawl 22 is then urged downwardly by spring 28 and presses against surface 17. Engagement of the pawl 22 with the notched locking ring 11 is prevented until the speed of ring 11 is reduced to zero and the rotation of ring 11 reverses.

The reversal of ring 11 is effected by a reduction of engine speed (measured in miles per hour of vehicle speed) below vehicle speed by a predetermined mount dependent upon the gear ratio of overdrive to normal drive. For example, if the overdrive increases the speed ratio between vehicle drive wheels and the engine by 30%, the engine speed must be reduced below vehicle speed by the amount of 30% of vehicle speed. Assuming the vehicle is being propelled through normal drive at 40 M. P. H. and it is desired to go into overdrive, the driver releases the accelerator pedal to permit engine speed to decrease. The vhicle "free wheels" (through overrunning clutch 9—10) at a speed starting at 40 M. P. H. and diminishing slightly due to resistance of wind and friction to about 35 M. P. H. Meanwhile the engine speed has diminished to 24 M. P. H., which speed is slightly more than 30% less than 35 M. P. H., the concurrent vehicle speed. As the engine speed decreases to 24 M. P. H., the speed of ring 11 is reduced to rezo and then the ring 11 starts to reverse in direction of rotation or to move clockwise as viewed in Fig. 2. As ring 11 begins to move slowly clockwise, it drags frictionally the blocker plate 13 clockwise thereby causing the lug 15 to move away from the boss 20 and its notch 18 to become aligned with pawl 22 thereby permitting the spring 28 to press pawl 22 against a tooth of ring 11. As ring 11 continues to rotate, it brings a notch 12 into alignment with pawl 22, thereby permitting spring 28 to press pawl 22 into locking engagement with the ring 11, thereby locking sun gear 6. While the sun gear 6 is locked, transmission of power from the shaft 1 to the shaft 8b takes place through the elements 2, 3a, 3, 4, 5, 7a, 7 and 8. The sun gear 6 being stationary, the ring gear 7a rotates faster than shaft 1. Since parts 9 and 7 are connected through a one-way clutch represented by the numeral 10, the ring 7 overruns the shaft 1 while the overdrive is effective.

During movement of the solenoid armature 25 toward the core 24 in order to preload the spring 28 so that it may push the pawl 22 into a notch 12 of the sun gear locking ring 11 when the blocker 13 is retracted, the flange 31 of nut 29 engages the resilient contact arm 35 thereby separating contact 36 from contact 37 and breaking the circuit through the main attracting coil 40 of the solenoid. The armature 25, being then in relatively close proximity with the core 24, is held in the attracted position by the holding coil 41.

The closing of contacts 72 and 73 of relay 60 connects winding 82 of relay 80 with the battery 54, thereby attracting armature 85 toward the core 81 against which it seals, thereby separating contact 86 from contact 87. Normally current from the ignition coil 101 flows from the battery 54 across contacts 87 and 86. However, before these contacts separate, a by-pass around these contacts is established by the closing of contacts 68 and 69 and by the closing of contacts 70 and 71 all of which closes ahead of the closing of contacts 72 and 73 of relay 60; therefore, before relay 80 is energized to separate contact 86 from contact 87, there will have been established communication between the battery and the ignition coil independent of contacts 86 and 87. This independent circuit includes the wire 65, terminal 64, contacts 69—68 and armature 66, contacts 70—71, wire 71a, wire 99 and ignition switch 100. Therefore there is no interruption of ignition current when the relay 60 closes and when relay 80 opens.

When the driver wishes to render the overdrive inoperative, that is, to return from overdrive gear ratio to the normal gear ratio, such as 1-to-1 if the transmission is in high gear, he presses the kick-switch rod 120 which causes the contact 111 to separate from the contacts 112 and 113 and to engage the contacts 114 and 115. When contact 111 moves away from contacts 112—113, the circuit of the coil 62 of relay 60 is broken, thereby permitting armature 66 to move to the normal position shown in the drawing. Consequently the solenoid unit 30, the relay 80 and the ignition coil 101 will be disconnected from the battery 54. Under these conditions the solenoid armature 25 is released from magnetic pull so as to permit the spring 32 to return to its upward position, thereby retracting the pawl 22 from the sun gear locking ring 11. Immediately following the opening of relay 60 the ignition is momentarily rendered non-operative because the armature 85 of relay 80 does not immediately return to contact-making position. When the ignition is non-operative the engine does not operate under its own power; therefore a condition is produced which is favorable to the retraction of the sun gear locking pawl 22 by the spring 32. As will be explained in more detail later, under this favorable condition the spring 32 operates to retract the pawl 22. During normal movement of the nut 29 its flange 31 is moved away from the contact blade 35, thereby permitting contact 36 to reengage contact 37.

A predetermined time after the opening of relay 60, the contacts 86 and 87 of relay 80 are engaged in order to restore the normal connection between the battery and the ignition coil. This predetermined time is measured or determined by the relay 80. The lag or time delay between the opening of contacts 72 and 73 of relay 60 and the opening of contacts 86 and 87 of relay 80 is effected by causing the armature 85 to seat or seal against the core 81 of relay 80 when its contacts are closed, thereby making it necessary for the magnetic flux in the core 81 to diminish substantially to zero before the armature 85 is released. The decay of flux in the core 81 is retarded by the short circuited coil 88 and by the non-inductive resistance 89 if used. Since contacts 72 and 73 open ahead of contacts 68 and 69, any inductive kick from the magnet coil 41 of solenoid 30 is prevented from influencing the relay 80 in such a way as to accelerate the decay of flux in relay 80.

Assuming for the moment that the system did not include the relay 90, the purpose of which is to be described later, then between the time that contacts 68 and 69 of relay opening and the closing of contacts 86 and 87 of relay 80, the engine will be non-operative for a predetermined time, thereby relieving the torque reaction between the sun locking gear 11 and the pawl 22 in order to facilitate retraction of the pawl by the spring 32. This predetermined period of non-operation of the engine may be on the order of one-tenth second, assuming that the relay 90 is not in the system. This period of time should normally be sufficient for the retraction of the pawl 22. However, if the pawl 22 is not retracted for any reason, such as failure of the spring 32, the relay 80 finally restores the ignition to operative condition regardless of whether the overdrive has been rendered inoperative. Since there is a time interval of appreciable duration between the rendering of the ignition inoperative and the restoration of the ignition to operative condition there have been brought about two separate instances (assuming that relay 90 is not present) where conditions are favorable to the retraction of the pawl from sun gear locking position by the pawl returning spring.

I will first discuss the instance where the ignition is rendered inoperative. It will be understood there is a certain amount of lost motion or side play between the pawl 22 and the sides of a notch 12 of the locking ring 11. While the engine ignition is inoperative and the engine drives the vehicle, the torque transmitted by the engine to the vehicle drive wheels is what may be termed positive torque. When the engine ignition is rendered inoperative, the vehicle tends to drive the engine and the transmission of torque is reversed. This reversed torque may be termed negative torque. When positive torque is present the pawl 22 will press against one side of a notch 12 and, when negative torque is present, the pawl 22 will press against the other side of the notch 12. It is obvious that, if the ignition is rendered inoperative causing the engine to cease to fire, the torque will change from positive to negative and the pawl 22 will move from a position where it presses against one side of the notch 12 to a position where it presses against the other side of the notch. During the period of time of relative sidewise movement between the notch 12 and the pawl 22 in which the pawl 22 relatively moves from one side of the notch 12 to the other, there is a condition where there is no binding force between the ring 11 and pawl 22 to resist withdrawal of the pawl 22 by the pawl return spring 32. This change from positive torque to negative torque produces a condition which is favorable to the retraction of the pawl 22 from the ring 11. Obviously the duration of this condition is relatively short, since it continues only long enough for the pawl to leave one side of the notch, traverse the lost motion space between the sides of the notch and then engage the opposite sides of the notch. Under some unusual circumstances, this period of short duration might not be sufficient for the pawl 22 to be completely withdrawn from the sun gear locking ring 11. However, another instance of favorable conditions for retraction of the pawl 22 by the spring 32 is afforded.

At the end of the measured time interval provided by relay 80 during which the ignition may be inoperative, there is another condition of no binding between the pawl 22 and ring 11 at the instant when the ignition apparatus is rendered operative, because there is another reversal of torque from negative torque to positive torque. Therefore, the system without the relay 90 provides two instances which are favorable to the retraction of the pawl 22 of the sun gear locking ring 11. Therefore there are two opportunities for the pawl 22 to be retracted, in the system without the relay 90.

Lamp 140 burns to indicate the closing of relay 60, and the subsequent energization of solenoid 30.

In order to provide more than two opportunities for the pawl 22 to be retracted, I provide the vibratory circuit breaker 90 which operates intermittently to render the ignition inoperative and operative several times during the interval between the opening of contacts 68—69 of relay 60 and the closing of contacts 86 and 87 of relay 80. The vibratory circuit breaker 90 operates in the following manner:

When the kick-switch plunger 120 is moved down, the contact 111 is caused to bridge the contacts 114 and 115, thereby connecting the magnet coil 92 of the circuit interrupter 90 with the battery. This causes the armature 96 to be attracted to separate contacts 94—95 and then to engage contacts 97 and 98. Whenever contacts 97 and 98 are engaged, the ignition coil 101 will be connected with the battery. Whenever contacts 94 and 95 are separated, the magnet coil 92 will be disconnected from the battery; therefore the armature 96 being a resilient reed member or a hinged member normally biased upwardly, will vibrate in the fashion of a buzzer to intermittently make and break its own magnetic circuit as well as to intermittently make and break a circuit between the battery and the ignition coil. Therefore during each cycle of movement of the armature 96 including a downward and an upward movement, there will be a making and a breaking of the ignition circuit.

The periodicity of vibratory interrupter 90 will be made different from the periodicity of the ignition timer 104 throughout the range within which it is intended that the control system can be operated to come out of overdrive. Therefore during the interval between the opening of relay 60 and the closing of relay 80, there will be several instances where the contacts 97—98 of vibrator 90 will be open when the breaker contacts of the timer 104 begin to separate; and there will be several instances when the vibratory contacts 97—98 will be closed at the time the timer contacts begin to separate. Thus, during this time interval between the opening of relay 60 and the closing of relay 80, there will be instances of ignition spark failure successively interspersed with instances of ignition sparking. In this way I have provided conditions of engine non-operation interspersed with conditions of engine operation, and have provided conditions favorable to sun-gear locking-pawl retraction in addition to the conditions present in a system without the vibratory interrupter 90. The present system therefore minimizes the possibility of failure of the pawl 22 to be retracted when ever the driver pushes down the kick switch rod 120 for the purpose of coming out of overdrive.

When the driver releases the rod 120 to permit the contact 111 to engage only contacts 112 and 113, the overdrive will be restored. Above a certain relatively high speed such as 50 to 60 M. P. H. for example, the air vane 131 will engage contact 138 thereby by-passing switch 110 so that the depressing of rod 120 will be ineffective to interrupt the circuit of coil 62 of relay 60 so that the car will remain in overdrive above a certain speed regardless of the condition of switch 110.

While the embodiment of the present invention as herein disclosed constitutes a preferred form, it is to be understood that other forms might be adopted, all coming within the scope of the claims which follow.

What is claimed is as follows:

1. For use in an overdrive control system for automobiles, the combination comprising, a current source, electrical ignition apparatus operated by the current source, a measured time relay normally in condition for controlling a circuit to render the ignition operative but movable when energized into condition for rendering the ignition inoperative, a control relay when energized, for controlling the magnet coil of the measured time relay and for controlling a circuit for the purpose of maintaining the ignition operative, means for controlling the circuit of the current source and control relay magnet coil, and a vibratory circuit breaker for intermittently rendering the ignition operative and inoperative during the interval between return of the armature of the control relay to normal position and the return of the armature of the measured time relay to normal position.

2. For use in an overdrive system for automobiles the combination comprising, a current source, electrical ignition apparatus operated by the current source, a measured-time relay normally in condition for controlling a circuit to render the ignition operative but movable when energized into condition for rendering the ignition inoperative, a control relay when energized, for controlling the magnet coil of the measured-time relay and for controlling a circuit for the purpose of maintaining the ignition operative, a vibratory circuit breaker for intermittently rendering the ignition operative and inoperative during the interval between return of the armature of the control relay to normal position and the return of the armature of the measured time relay to normal position, and means for controlling the circuit of the current source and the magnet coil of the control relay and including a switch having two circuit controlling positions, namely, a normal position in which a gap in the control relay magnet coil circuit is bridged, and another position disconnecting the control relay magnet circuit and connecting the vibratory circuit breaker with the battery.

3. For use in an overdrive system for automobiles the combination comprising, a current source, electrical ignition apparatus operated by the current source, a measured time relay normally in condition for controlling a circuit to render the ignition operative but movable when energized into condition for rendering the ignition inoperative, a control relay when energized, for controlling the magnet coil of the measured time relay and for controlling a circuit for the purpose of maintaining the ignition operative, a vibratory circuit breaker for intermittently rendering the ignition operative and inoperative during the interval between return of the armature of the control relay to normal position and the return of the armature of the measured time relay to normal position, and means for causing the control relay to be deenergized and for causing the vibratory circuit breaker to operate.

4. For use in an overdrive system for automobiles the combination comprising, a current source, electrical ignition apparatus operated by the current source, a measured-time relay normally in condition for controlling a circuit to render the ignition operative but movable when energized into condition for rendering the ignition inoperative, a control relay when energized, for controlling the magnet coil of the measured-time relay and for controlling a circuit for the purpose of maintaining the ignition operative, a vibratory circuit breaker for intermittently rendering the ignition operative and inoperative during the interval between return of the armature of the control relay to normal position and the return of the armature of the measured time relay to normal position, means for causing the control relay to be deenergized and for causing the vibratory circuit breaker to operate, and means responsive to vehicle speed for causing said control relay to remain operative regardless of the status of said first named means.

5. For use with an automobile overdrive having a movable member for controlling the status of the overdrive, a current source, an electromagnet for operating said member, a control relay for connecting the current source with the member operating magnet, a normally closed manual operable switch, and means responsive to vehicle speed for connecting the current source with the relay through the manually operable switch when a certain intermediate vehicle speed is attained and for connecting the current source with the relay independently of the manually operable switch when a certain higher vehicle speed is attained.

6. For use with an automobile overdrive having a movable member for controlling the status of the overdrive, a current source, an electromagnet for operating said member, a control relay for connecting the current source with the member operating magnet, means including a manually operable switch and a switch responsive to the attainment of a certain vehicle speed for connecting the control relay with the current source, and other means responsive to the attainment of a relatively higher vehicle speed for maintaining connection between the control relay and current source independently of the status of the first named means.

7. For use in an overdrive system for automobiles the combination comprising, a current source, electrical ignition apparatus operated by the current source, a measured time relay normally in condition for controlling a circuit to render the ignition operative but movable when energized into condition for rendering the ignition inoperative, a control relay when energized for controlling the magnet coil of the measured-time relay and for controlling a circuit for the purpose of maintaining the ignition operative, a vibratory circuit breaker for intermittently rendering the ignition operative and inoperative during the interval between return of the armature of the control relay to normal position and the return of the armature of the measured time relay to normal position, means including a manually operable switch and a switch responsive to the attainment of a certain vehicle speed for connecting the control relay with the current source, said manually operable switch being movable to a position to disconnect the control relay from the current source and to connect the current source with the vibratory circuit interrupter and other means responsive to the attainment of a relatively higher vehicle speed for maintaining connection between the control relay and current source independently of the status of the first named means.

EDWARD M. CLAYTOR.